United States Patent
Wu et al.

(10) Patent No.: US 10,788,909 B2
(45) Date of Patent: Sep. 29, 2020

(54) DISPLAY PANEL HAVING RED SUB-PIXELS, BLUE SUB PIXELS, GREEN SUB-PIXELS, AND HIGH-BRIGHTNESS SUB PIXELS

(71) Applicant: Xiamen Tianma Micro-Electronics Co., Ltd., Xiamen (CN)

(72) Inventors: Huangyao Wu, Xiamen (CN); Hongbo Zhou, Xiamen (CN); Xiufeng Zhou, Xiamen (CN); Boping Shen, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/983,310

(22) Filed: May 18, 2018

(65) Prior Publication Data

US 2019/0235675 A1    Aug. 1, 2019

(30) Foreign Application Priority Data

Jan. 31, 2018    (CN) .......................... 2018 1 0093938

(51) Int. Cl.
  *G06F 3/041* (2006.01)
  *G06F 3/044* (2006.01)
  *G09G 3/20* (2006.01)

(52) U.S. Cl.
  CPC .......... *G06F 3/0412* (2013.01); *G06F 3/0443* (2019.05); *G06F 3/0448* (2019.05);
  (Continued)

(58) Field of Classification Search
  CPC ... G09G 2300/0426; G09G 2300/0452; G09G 2320/0233; G09G 2320/0626;
  (Continued)

(56) References Cited

U.S. PATENT DOCUMENTS

2013/0088528 A1*  4/2013  Borgers ............... G09G 3/3648
                                                        345/690
2015/0116615 A1*  4/2015  Seo ...................... G09G 3/3611
                                                        349/37
(Continued)

FOREIGN PATENT DOCUMENTS

CN      104536632 A    4/2015
CN      105487719 A    4/2016
(Continued)

OTHER PUBLICATIONS

Chinese Office Action dated Oct. 8, 2019 for Corresponding CN Application No. 201810093938.0.

*Primary Examiner* — Ryan A Lubit
(74) *Attorney, Agent, or Firm* — Tarolli, Sundheim, Covell & Tummino LLP (57) ABSTRACT

The present disclosure provides a display panel and display device. Display panel includes: a plurality of first sub-pixel groups and a plurality of second sub-pixel groups, the first sub-pixel group each including a plurality of first sub-pixels, the second sub-pixel groups each including a plurality of second sub-pixels, a contribution value of the first sub-pixels to the illumination brightness of the display panel being greater than that of the second sub-pixels to the illumination brightness of the display panel; a first data line connected to the first sub-pixels in the first sub-pixel group; a second data line connected to the second sub-pixels in the second sub-pixel group; a plurality of touch electrodes and a plurality of touch signal lines, a distance from the touch signal line to its closest second data line being smaller than a distance from the touch signal line to its closest first data line.

18 Claims, 8 Drawing Sheets

(52) U.S. Cl.
CPC ........... *G06F 3/04164* (2019.05); *G09G 3/20* (2013.01); *G06F 3/044* (2013.01); *G06F 3/0418* (2013.01); *G09G 2300/0426* (2013.01); *G09G 2300/0452* (2013.01); *G09G 2320/0233* (2013.01)

(58) Field of Classification Search
CPC .... G06F 3/0412; G06F 3/0416; G06F 3/0418; G06F 3/044; G06F 3/0443; G06F 3/0448
See application file for complete search history.

(56) References Cited

U.S. PATENT DOCUMENTS

| | | | |
|---|---|---|---|
| 2017/0256193 A1* | 9/2017 | Zhou | G09G 3/3607 |
| 2018/0040284 A1* | 2/2018 | Kang | G09G 3/3607 |
| 2018/0174533 A1* | 6/2018 | An | G09G 3/36 |
| 2018/0335878 A1* | 11/2018 | Chen | G06F 3/0412 |
| 2019/0056830 A1* | 2/2019 | Li | G02F 1/13338 |

FOREIGN PATENT DOCUMENTS

| | | |
|---|---|---|
| CN | 106873226 A | 6/2017 |
| CN | 107390441 A | 11/2017 |
| CN | 107562270 A | 1/2018 |

\* cited by examiner

DISPLAY PANEL HAVING RED SUB-PIXELS, BLUE SUB PIXELS, GREEN SUB-PIXELS, AND HIGH-BRIGHTNESS SUB PIXELS

CROSS-REFERENCE TO RELATED APPLICATIONS

The present application claims priority to Chinese Patent Application No. 201810093938.0, filed on Jan. 31, 2018, the content of which is incorporated herein by reference in its entirety.

TECHNICAL FIELD

The present disclosure relates to a field of display technologies, in particular, to a display panel and a display device.

BACKGROUND

With the development of the display technologies, the user's requirements for the quality of the images displayed by the display device are increasing higher.

As it is known, the display device includes a driving chip and a display panel, the driving chip provides a data signal for controlling an illumination brightness of a sub-pixel, the data signal is transmitted to a corresponding sub-pixel through a data line to drive the corresponding sub-pixel to illuminate. However, since a certain degree of signal attenuation exists in a process of transmitting the data signal on the data line, the actual illumination brightness of the sub-pixel usually deviates from its standard value, resulting in poor display. In order to solve the abovementioned problems, in the related art, the attenuation of the data signal is usually reduced by adjusting the wiring resistance of the data line, but the improvement effect in this way is not significant.

SUMMARY

In view of the above, the embodiments of the present disclosure provide a display panel and display device, for significantly ameliorating the poor display problems caused by the data signal attenuation.

In one aspect, the embodiments of the present disclosure provide a display panel. The display panel includes: a plurality of first sub-pixel groups and a plurality of second sub-pixel groups, a plurality of first data lines corresponding to the plurality of first sub-pixel groups in one-to-one correspondence, a plurality of second data lines corresponding to the plurality of second sub-pixel groups in one-to-one correspondence, and a plurality of touch electrodes and a plurality of touch signal lines. The plurality of first sub-pixel groups and the plurality of second sub-pixel groups are arranged alternately in a row direction, the plurality of first sub-pixel groups each includes a plurality of first sub-pixels arranged in a column direction, and the plurality of second sub-pixel groups each includes a plurality of second sub-pixels arranged in the column direction, and a contribution value of the first sub-pixels to an illumination brightness of the display panel is greater than a contribution value of the second sub-pixels to the illumination brightness of the display panel. Each of the plurality of first data lines is connected to a plurality of first sub-pixels in a corresponding first sub-pixel group. Each of the plurality of second data lines is connected to a plurality of second sub-pixels in a corresponding second sub-pixel group. Each of the plurality of touch signal lines is connected to a respective one of the plurality of touch electrodes, and a distance from each of the plurality touch signal lines to its closest second data line is smaller than a distance from the touch signal line to its closest first data line.

In another aspect, the embodiments of the present disclosure provide a display device, the display device including the abovementioned display panel.

BRIEF DESCRIPTION OF DRAWINGS

In order to more clearly illustrate the technical solution of the embodiments of the present disclosure, the following simply introduces the accompanying drawings that are necessarily used in the embodiments. It should be noted that the drawings of the following description are merely some embodiments of the present disclosure. For those having ordinary skill in the art, other drawings can be obtained from these accompanying drawings without any inventive labor.

DESCRIPTION OF EMBODIMENTS

For better illustrating the technical solutions of the present disclosure, the embodiments of the present disclosure are described below in detail in combination with the accompanying drawings.

It should be understood that the described embodiments are merely part of the embodiments of the present disclosure, rather than all the embodiments. Based on the embodiments of the present disclosure, all other embodiments attained by those having ordinary skill in the art without making inventive labor are falling within the protection scope of the present disclosure.

The terms used in the embodiments are merely for the purpose of describing embodiments instead of being intended to limiting the disclosure. The singular form "a(an)", "the" and "said" used in the embodiments of the present disclosure and the appended claims are also intended to include plural forms, unless other meanings are clearly indicated in the context.

It should be understood, the term "and/or" used herein only describes an incidence relation between the associated objects and it means that there may exist three relations, for example, A and/or B, which may represent three cases: A is present alone; A and B are present at the same time; B is present alone. In addition, herein, a character "/" generally represents that the objects in a "/" relation are in a "or" relation.

It should be understood that, although the term first, second and the like are used to describe sub-pixels in the embodiments of the present disclosure, these sub-pixels should not be limited thereto. These terms are merely used for distinguishing the sub-pixels from one another. For example, without departing from the scope of the embodiments of the present disclosure, a first sub-pixels may also be referred to as a second sub-pixels; similarly, a second sub-pixel may also be referred to as a first sub-pixel.

Figure 1:
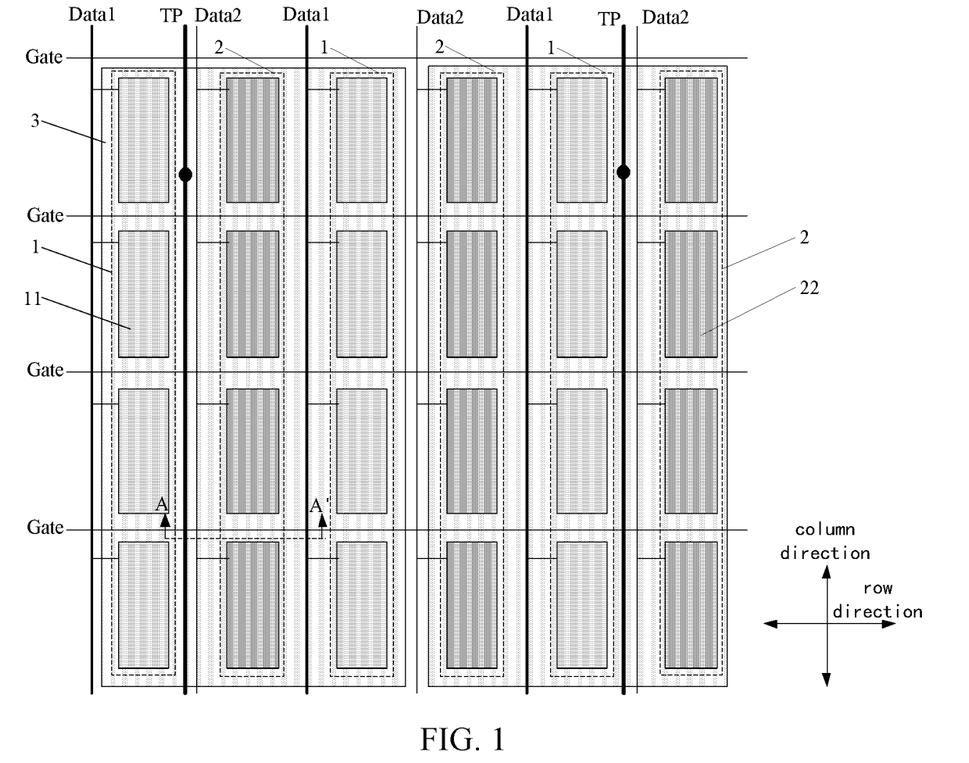
FIG. 1 is a top view of a display panel provided by an embodiment of the present disclosure.

The embodiments of the present disclosure provide a display panel. As shown in FIG. 1, the display panel includes a plurality of first sub-pixel groups 1 and a plurality of second sub-pixel groups 2 which are arranged alternately in a row direction. The first sub-pixel groups include a plurality of first sub-pixels 11 arranged along a column direction, and the second sub-pixel groups 2 include a plurality of second sub-pixels 22 arranged along a column direction, wherein a contribution value of the first sub-pixels 11 to the illumination brightness of the display panel is greater than that of the second sub-pixels 22 to the illumination brightness of the display panel.

The display panel further includes a plurality gates lines Gate, a plurality of first data lines Data1 and a plurality of second data lines Data2, wherein the plurality of first data lines Data1 are in one-to-one correspondence with the plurality of first sub-pixel groups 1, and each first data line Data1 is connected to each of the first sub-pixels 11 in the corresponding first sub-pixel group 1. The plurality of second data lines Data2 are in one-to-one correspondence with the plurality of second sub-pixel groups 2, and each second data line Data2 is connected to each of the second sub-pixels 22 in the corresponding second sub-pixel group 2.

In addition, in order to achieve the touch function of the display panel, the display panel further includes a plurality of touch electrodes 3 and a plurality of touch signal lines TP; each of the touch signal lines TP is connected to a respective one touch electrode 3; a distance from the touch signal line TP to its closest second data line Data2 is smaller than a distance from the touch signal line TP to its closest first data line Data1.

It should be noted that, as described above, the first sub-pixels 11 with a higher contribution value to the illumination brightness of the display panel refer to sub-pixels with higher light transmittance and capable of providing higher illumination brightness, or sub-pixels from which the light is emitted with higher sensitivity with respect to human eyes.

Exemplarily, when the display panel includes red sub-pixels, green sub-pixels, blue sub-pixels and white sub-pixels, the light transmittance of the white sub-pixels is greater than that of other sub-pixels. Compared with the traditional display panel only including red sub-pixels, green sub-pixels and blue sub-pixels, if these two display panels need to display the image with the same brightness; the white sub-pixels can provide the brightness which the red sub-pixels, the green sub-pixels and the blue sub-pixels simultaneously lighten, so the white sub-pixels have higher contribution value to the illumination brightness of the display panel.

However, for the red sub-pixels, the green sub-pixels and the blue sub-pixels, a photon frequency range of the red light is 3.9-4.8 Hz, a photon frequency range of the green light is 5.2-6.1 Hz, and a photon frequency range of the blue light is 6.1-6.7 Hz, the photon frequency range of the green light that is perceivable by human eyes is the largest, that is, the sensitivity of human eyes to blue light is higher. Therefore, compared with the red sub-pixels and the green sub-pixels, the amount of the light emitted from the green sub-pixels that is perceivable by human eyes is the largest, i.e., the light transmittance of the green sub-pixels is the highest; usually, the green sub-pixels can contribute about 70% of the pixel brightness.

Generally, when the display panel includes red sub-pixels, green sub-pixels, blue sub-pixels and white sub-pixels, the white sub-pixels and the green sub-pixels can contribute more than 80% of the pixel brightness when the display panel normally displays an image. Therefore, compared with the red sub-pixels and the blue sub-pixels, both the white sub-pixels and the green sub-pixels belong to the first sub-pixels 11.

It should be noted that, the white sub-pixels belong to the high-brightness sub-pixels, while the yellow sub-pixels also belong to the high-brightness sub-pixels. As similar to the white sub-pixels, the light transmittance of the yellow sub-pixels is also higher than that of other sub-pixels. Therefore, when the display panel includes yellow sub-pixels, the yellow sub-pixels also usually belong to the first sub-pixels 11.

It should be understood that, different sub-pixels have different contribution values to the illumination brightness of the display panel. Thus, the sub-pixels can be divided into the first sub-pixels 11 and the second sub-pixels 22 according to the contribution values of each sub pixel to the illumination brightness of the display panel, no matter what type of sub-pixels the display panel includes.

The inventor found that, based on the relative positional relation of each structure in the display panel, coupling capacitance will be generated between multiple structures such as the data line and the gate line, the touch electrode, the touch signal line and the like, while the coupling capacitance will cause signal attenuation to the data signal transmitted on the data line. Taking a liquid crystal display panel as an example, the inventor has findings through further research that under a certain process condition, in a unit area defined by overlapping the data line with two gate lines, the coupling capacitance $C1$ generated between the data line and one of the two gate lines is equal to 1.73E-15, the coupling capacitance $C2$ generated between the data line and the other one of the two gate lines is equal to 1.72E-15, the coupling capacitance $C3$ generated between the data line and the pixel electrode is equal to 8.41E-16, the coupling capacitance $C4$ generated between the data line and the touch signal line is equal to 4.93E-15, the coupling capacitance $C5$ generated between the data line and the touch electrode is equal to 5.15E-15. It can be seen that, compared with other structures, the coupling capacitance generated between the data line and the touch signal line is the largest, that is, the touch signal line has the greatest influence on the data signal transmitted on the data line. Moreover, it can be derived according to the formula $C4/C1+C2+C3+C4+C5+C6$ that, the coupling capacitance generated between the data line and the touch signal line account for about 40% of all coupling capacitances generated by the data line.

Since the first sub-pixels 11 has a higher contribution value to the illumination brightness of the display panel than that of the second sub-pixels 22 to the illumination brightness of the display panel, the illumination brightness deviation of the first sub-pixels 11 has higher influence on the illumination brightness of the whole image than that of the second sub-pixels 22 on the illumination brightness of the whole image. Based on this, in this embodiment, when the touch signal line TP is disposed, by disposing the touch signal line TP adjacent to the second data line Data2, the distance from the touch signal line TP to its closest second data line Data2 is smaller than the distance from the touch signal line TP to its closest first data line Data1, such that the distance between the touch signal line TP and the first data line Data1 can be increased, thereby reducing the coupling between the touch signal line TP and the first data line Data1. In this way, the attenuation of the data signal transmitted on the first data line Data1 caused by the coupling capacitance can be greatly decreased, so as to significantly ameliorate the offset amount of the illumination brightness of the first sub-pixels 11, improving the display quality.

The touch signal line TP and the second data line Data2 can be disposed in different layers or disposed in a same layer.

Figure 2:
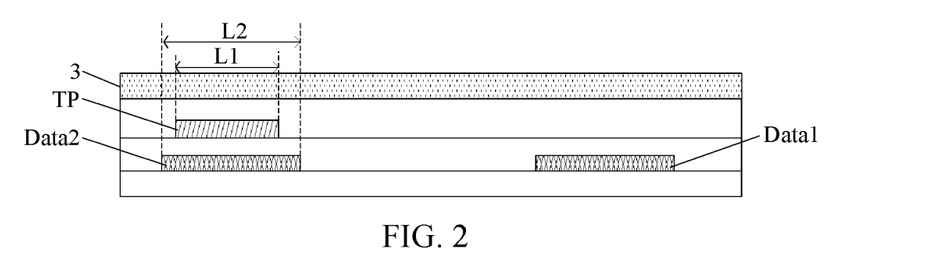
FIG. 2 is cross-sectional schematic diagram along an A-A' direction in FIG. 1.

Optionally, as shown in FIG. 2, FIG. 2 is a cross-sectional schematic diagram along A-A' direction in FIG. 1, in which the touch signal line TP and the second data line Data2 are disposed in different layers; moreover, the touch signal line TP extends in the same direction as the second data line Data2; the orthographic projection of the touch signal line TP on the layer of the second data line Data2 at least partially overlaps with the second data line Data2.

Further, a width L1 of the touch signal line TP in the row direction can be made smaller than a width L2 of the second data line Data2 in the row direction. With this configuration, an overlapping area between the touch signal line TP and the second data line Data2 can be decreased and the coupling therebetween can be decreased, thereby reducing the influence of the coupling capacitance on the data signal transmitted on the second data line Data2 so as to reduce the offset amount of the illumination brightness of the second sub-pixels 22.

Figure 3:
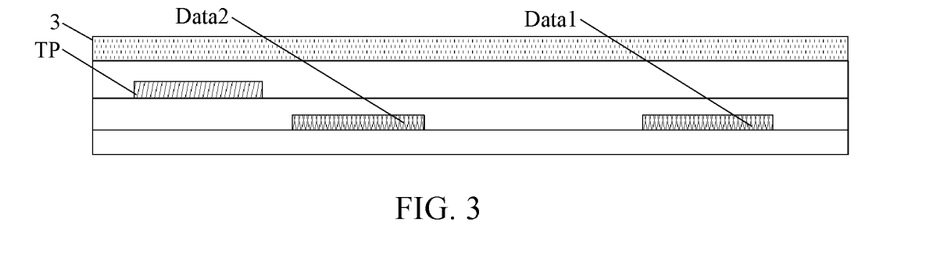
FIG. 3 is another cross-sectional schematic diagram along an A-A' direction in FIG. 1.

Optionally, as shown in FIG. 3, FIG. 3 is another cross-sectional schematic diagram along an A-A' direction in FIG. 1. The touch signal line TP and the second data line Data2 are disposed in different layers, and the touch signal line TP extends in the same direction as the second data line Data2. The orthographic projection of the touch signal line TP on the layer of the second data line Data2 does not overlap with the second data line Data2.

With this configuration, the touch signal line TP and the second data line Data2 are staggered from each other in the direction perpendicular to the plane where the display panel is located and thus there is no overlapping area therebetween. The coupling between the touch signal line TP and the second data line Data2 is decreased to some extent, thereby reducing the influence of the coupling capacitance on the data signal transmitted on the second data line Data2 so as to reduce the offset amount of the illumination brightness of the second sub-pixels 22.

Figure 4:
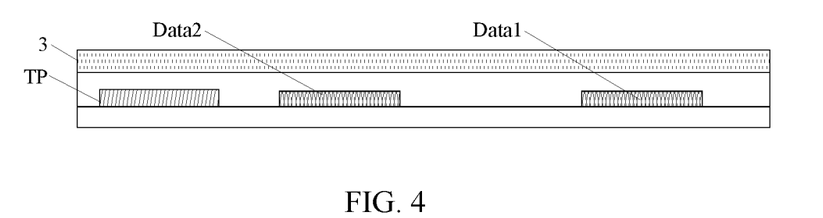
FIG. 4 is yet another sectional schematic diagram along an A-A' direction in FIG. 1.

Optionally, as shown in FIG. 4, FIG. 4 is still another cross-sectional schematic diagram along an A-A' direction in FIG. 1. The touch signal line TP and the second data line Data2 are disposed in a same layer. Moreover, in combination with FIGS. 1 and 4, a touch signal line TP is disposed on one side of the second data line Data2 far away from a corresponding second sub-pixel group 2.

In this embodiment, since the touch signal line TP is disposed adjacent to the second data line Data2, the touch signal line TP inevitably affects the data signal transmitted on the second data line Data2 and thus the illumination brightness of the second sub-pixels 22 is offset. If the touch signal line TP is disposed on one side of the second data line Data2 close to a corresponding second sub-pixel group 2, when the position of the touch signal line TP deviates due to the process, an aperture region of the second sub-pixel 22 may be blocked by the touch signal line TP to reduce the light transmittance of the second sub-pixel 22, in this case, the offset amount of the illumination brightness of the second sub-pixel 22 will be further increased, resulting in a more significant deviation in the illumination brightness of the second sub-pixel 22. Therefore, in order to reduce the influence of the touch signal line TP on the second sub-pixel 22, the touch signal line TP is disposed on one side of the second data line Data2 far away from a corresponding second sub-pixel group 2 in this embodiment. As such, even if the position of the touch signal line TP deviates, the light transmittance of the second sub-pixel 22 will not be influenced.

Figure 5:
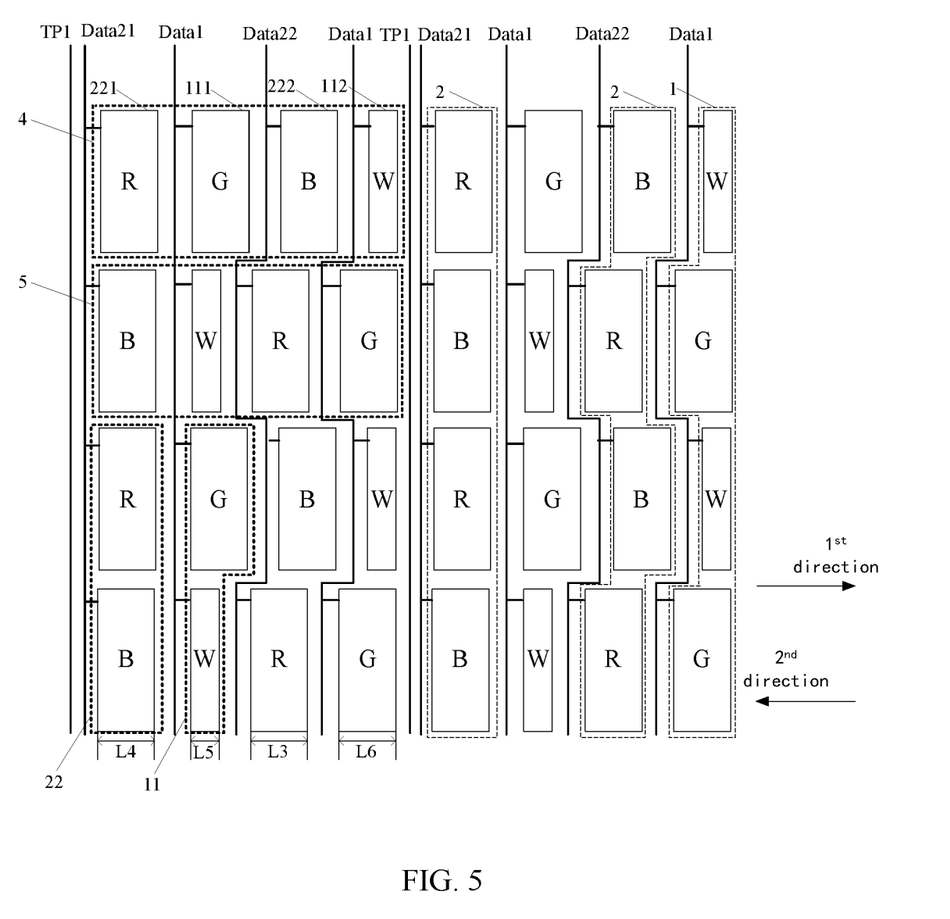
FIG. 5 is an arrangement schematic diagram of a touch signal line of a display panel provided by an embodiment of the present disclosure.

As shown in FIG. 5, the display panel includes a plurality of first pixel units 4 repeatedly arranged in odd-numbered rows and a plurality of second pixel units 5 repeatedly arranged in even-numbered rows, in which the first sub-pixels 11 may include green sub-pixels 111 and high-brightness sub-pixels 112, the second sub-pixels 22 may include red sub-pixels 221 and blue sub-pixels 222. The first pixel unit 4 includes a red sub-pixel 221, a green sub-pixel 111, a blue sub-pixel 222 and a high-brightness sub-pixel 112 which are sequentially arranged along a first direction; the second pixel unit 5 includes a blue sub-pixel 22, a high-brightness sub-pixel 112, a red sub-pixel 221 and a green sub-pixel 111 which are sequentially arranged along the first direction, wherein the first direction is parallel to the row direction.

Further, with further reference to FIG. 5, when each of the sub-pixels is disposed, a width L3 of the red sub-pixel 221 in the row direction may be equal to a width L4 of the blue sub-pixel 222 in the row direction, and a width L5 of the high-brightness sub-pixel in the row direction may be smaller than a width L3 of the red sub-pixel 221 in the row direction.

Taking the high-brightness sub-pixels 112 being white sub-pixels as an example, due to the high light transmittance of the white sub-pixels, a lot of white light will be emitted from one of the first pixel units 4 or one of the second pixel units 5, during which a color saturation reduction of the image will be caused. However, the area of the aperture region of the white sub-pixels can be decreased by reducing the width of the white sub-pixels in the row direction, so as to reduce the influence of the white light on the color saturation, improving the saturation.

It should be noted that, a width L6 of the green sub-pixel 111 in the row direction may be equal to or smaller than a width L3 of the red sub-pixel 221 in the row direction. The width of the green sub-pixel 111 may be defined according to actual needs and shall not be limited by this embodiment.

In the following, taking the arrangement of two sub-pixels as an example, the position configuration of the touch signal line TP is illustrated in details.

The arrangement of the first sub-pixels:

With further reference to FIG. 5, in a second sub-pixel group 2 including the red sub-pixels 221 of the first pixel units 4 and the blue sub-pixels 222 of the second pixel units 5, any one red sub-pixel 221 and any one blue sub-pixel 222, which are adjacent, are aligned. In a second sub-pixel group 2 including blue sub-pixels 222 of first pixel units 4 and red sub-pixels 221 of second pixel units 5, any one blue sub-pixel 222 and any one red sub-pixel 221 which are adjacent, are staggered from each other.

The second data lines Data2 include a first data signal transmission line Data21 and a second data signal transmission line Data22.

The first data signal transmission line Data21 corresponds to a second sub-pixel group 2 including red sub-pixels 221 of first pixel units 4; the first data signal transmission line Data21 extends in the same direction as each of a plurality of second sub-pixels 22 in a corresponding second sub-pixel group, in which each of the second sub-pixels 22 includes two first edges along the row direction, the first data signal transmission line Data21 extending in the same direction as each of the second sub-pixels 22 in the corresponding second sub-pixel group refers to that, the extending direction of the first data signal transmission line Data21 is the same as the extending direction of the first edges on a same side of the second sub-pixels 22. Any one red sub-pixel 221 and any one blue sub-pixel 222 in the second sub-pixel group 2, which are adjacent, are aligned, therefore, the first data signal transmission line Data21 extends vertically.

The second data signal transmission line Data22 corresponds to the second sub-pixel group 2 including blue sub-pixels 222 of first pixel units 4; the second data signal transmission line Data22 extends in the same direction as each of a plurality of second sub-pixels 22 in a corresponding second sub-pixel group, in which, the second data signal transmission line Data22 extending in the same direction as each of the second sub-pixels 22 in the corresponding second sub-pixel group refers to that, the extending direction of the second data signal transmission line Data22 is the same as the extending direction of the first edges on a same side of the second sub-pixels 22. Any one blue sub-pixel 222 and any one red sub-pixel 221 in the second sub-pixel group 2, which are adjacent, are staggered from each other, therefore, the second data signal transmission line Data22 extends in a bent way.

The touch signal lines TP include a first touch signal transmission line TP1 disposed adjacent to the first data signal transmission line Data21, such that the distance from the first touch signal transmission line TP1 to its closest first data signal transmission line Data21 is smaller than the distance from the first touch signal transmission line TP1 to its closest first data line Data1.

Compared with the second data signal transmission line Data22 that extends in a bent way, a wiring length of the vertically extending first data signal transmission line Data21 is relatively short. Therefore, by disposing the first touch signal transmission line TP1 adjacent to the first data signal transmission line Data21, the relative area between the first touch signal transmission line TP1 and the second data line Data2 can be decreased and the coupling between the first touch signal transmission line TP1 and the second data line Data2 can be decreased, thereby reducing the influence of the coupling capacitance on the data signal transmitted on the second data line Data2.

Moreover, when the first touch signal transmission line TP1 is disposed, in order to further reduce the wiring length of the first touch signal transmission line TP1 and reduce the coupling between the first touch signal transmission line TP1 and the first data signal transmission line Data21, the first touch signal transmission line TP1 may also extend vertically, that is, the extending direction of the first touch signal transmission line TP1 is the same as the extending direction of its closest first data signal transmission line Data21.

In addition, in order to increase the touch precision, a larger number of touch electrodes 3 may be disposed in the display panel, and the number of the touch signal lines TP needs to be increased accordingly. When the number of the touch signal lines TP is larger than that of the first data signal transmission lines Data21, the touch signal lines TP may also be disposed adjacent to the second data signal transmission lines Data22.

Figure 6:
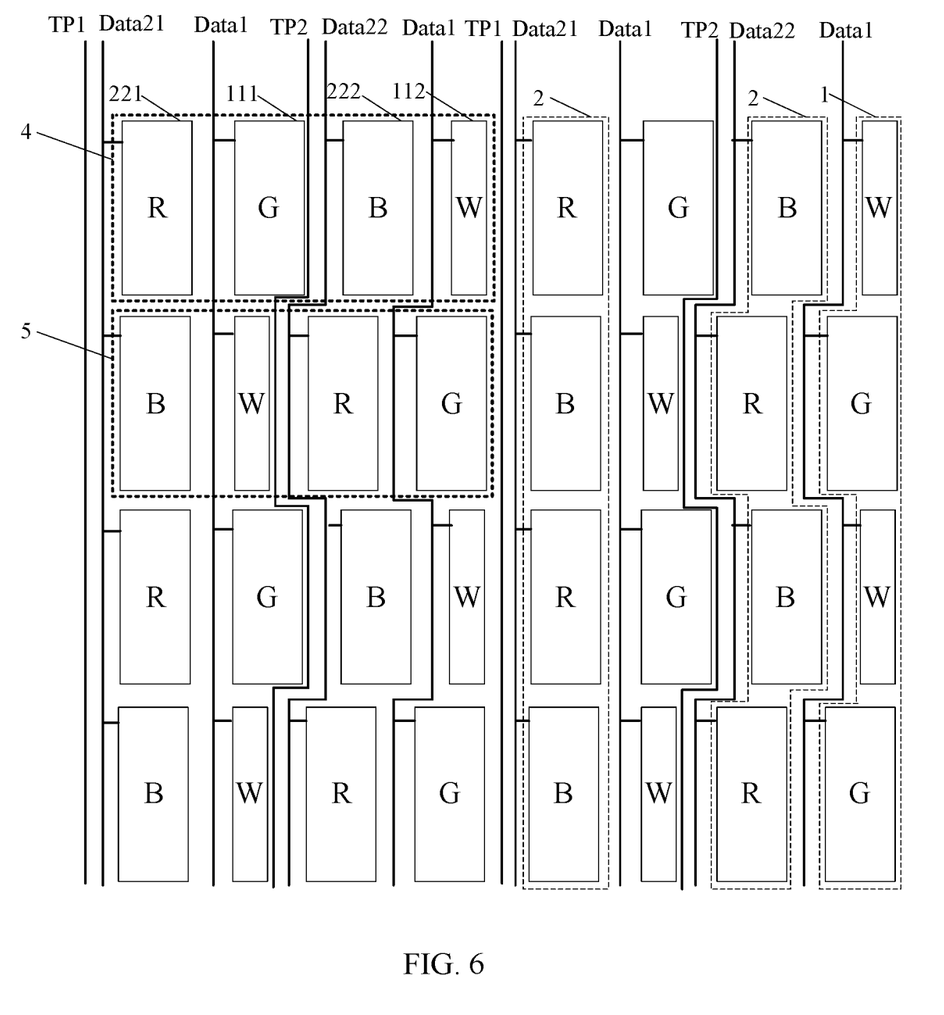
FIG. 6 is another arrangement schematic diagram of a touch signal line of a display panel provided by an embodiment of the present disclosure.

As shown in FIG. 6, the touch signal lines TP may also include a second touch signal transmission line TP2 that is disposed adjacent to the second data signal transmission line Data22 such that the distance from the second touch signal transmission line TP2 to its closest second data signal transmission line Data22 is smaller than the distance from the second touch signal transmission line TP2 to its closest first data line Data1.

Moreover, when the second touch signal transmission line TP2 is disposed, the extending direction of the second touch signal transmission line TP2 may be the same as the extending direction of its closest second data signal transmission line Data22, that is, the second touch signal transmission line TP2 is also extending in a bent way. When the second touch signal transmission line TP2 and the second data signal transmission line Data22 are disposed in different layers, due to the same extending direction, the second touch signal transmission line TP2 and the second data signal transmission line Data22 may be formed using a same mask plate, so as to reduce the manufacturing cost. When the second touch signal transmission line TP2 and the second data signal transmission line Data22 are disposed in the same layer, due to the same extending direction, the design complexity of the mask plate may be decreased by using the same mask plate to form the second touch signal transmission line TP2 and the second data signal transmission line Data22.

It should be noted that, compared with disposing the touch signal line TP adjacent to the first data line Data1, the influence on the overall illumination brightness of the display panel resulting from the touch signal line TP will be decreased, regardless of whether the touch signal line TP is disposed adjacent to the first data signal transmission line Data21 or the second data signal transmission line Data22.

Figure 7:
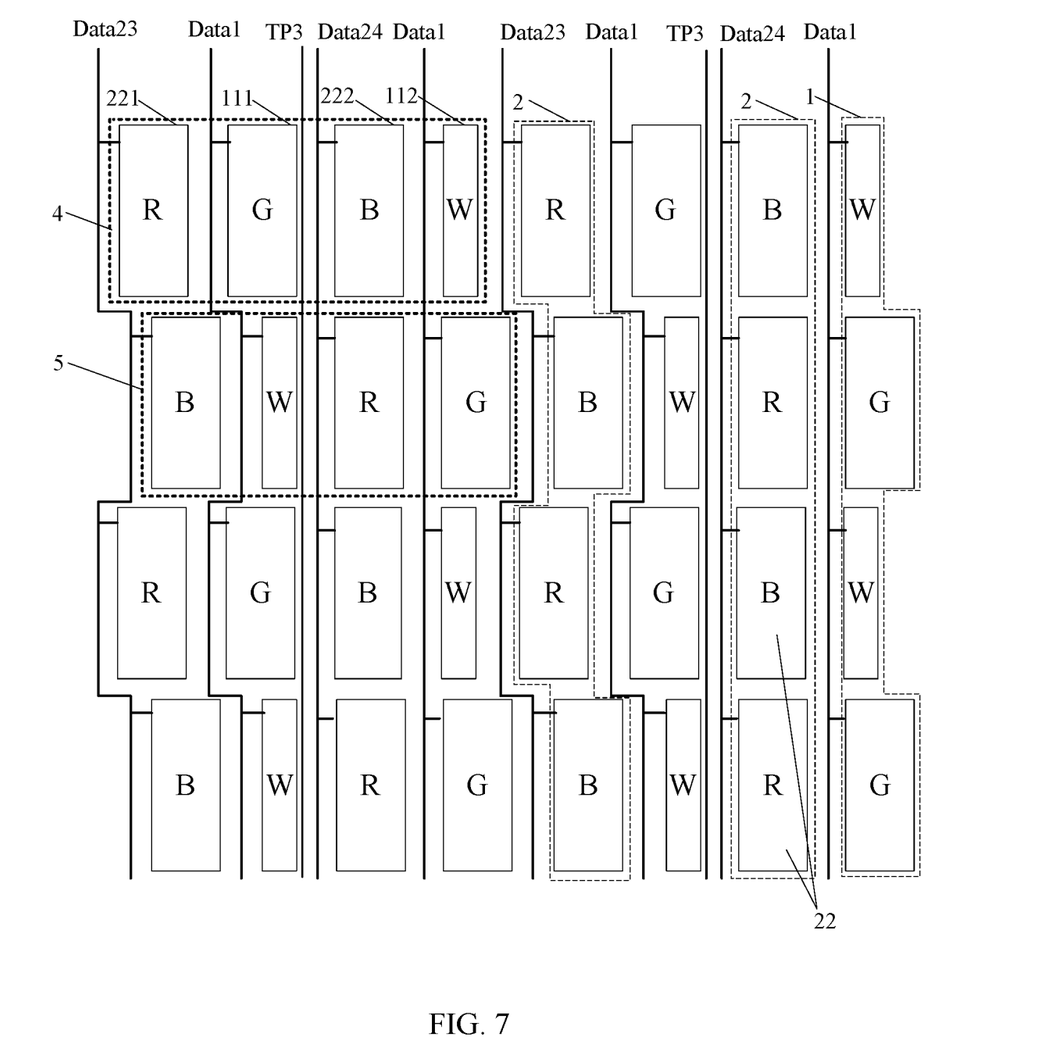
FIG. 7 is still another arrangement schematic diagram of a touch signal line of a display panel provided by an embodiment of the present disclosure.

The arrangement of the second sub-pixels:

As shown in FIG. 7, in a second sub-pixel group 2 including red sub-pixels 221 of first pixel units 4 and blue sub-pixels 222 of second pixel units 5, any one red sub-pixel 221 and any one blue sub-pixel 222, which are adjacent, are staggered from each other. In a second sub-pixel group 2 including blue sub-pixels 222 of first pixel units 4 and red sub-pixels 221 of second pixel units 5, any one blue sub-pixel 222 and any one red sub-pixel 221, which are adjacent, are aligned.

The second data lines Data2 include a third data signal transmission line Data23 and a fourth data signal transmission line Data24.

The third data signal transmission line Data23 corresponds to the second sub-pixel group 2 including red sub-pixels 221 of first pixel units 4; the third data signal transmission line Data23 extends in the same direction as each of a plurality of second sub-pixels 22 in a corresponding second sub-pixel group, in which, each of the second sub-pixels 22 includes two first edges along the row direction, the third data signal transmission line Data23 extending in the same direction as each of the second sub-pixels 22 in the corresponding second sub-pixel group refers to that, the extending direction of the third data signal transmission line Data23 is the same as the extending direction of the first edges on a same side of the second sub-pixels 22. Any one red sub-pixel 221 and any one blue sub-pixel 222 in the second sub-pixel group 2, which are adjacent, are staggered from each other, therefore, the third data signal transmission line Data23 extends in a bent way.

The fourth data signal transmission line Data24 corresponds to the second sub-pixel group 2 including blue sub-pixels 222 of first pixel units 4; the fourth data signal transmission line Data24 extends in the same direction as each of a plurality of second sub-pixels 22 in a corresponding second sub-pixel group, in which, the fourth data signal transmission line Data24 extending in the same direction as each of the second sub-pixels 22 in the corresponding second sub-pixel group refers to that, the extending direction of the fourth data signal transmission line Data24 is the same as the extending direction of the first edges on a same side of the second sub-pixels 22. Any one blue sub-pixel 222 and any one red sub-pixel 221 in the second sub-pixel group 2, which are adjacent, are aligned, therefore, the fourth data signal transmission line Data24 vertically extends.

The touch signal lines TP include a third touch signal transmission line TP3 disposed adjacent to the fourth data signal transmission line Data24, such that the distance from the third touch signal transmission line TP3 to its closest fourth data signal transmission line Data24 is smaller than the distance from the third touch signal transmission line TP3 to its closest first data line Data1.

Compared with the third data signal transmission line Data23 that extends in a bent way, a wiring length of the vertically extending fourth data signal transmission line Data24 is relatively short. Therefore, by disposing the third touch signal transmission line TP3 adjacent to the fourth data signal transmission line Data24, the relative area between the third touch signal transmission line TP3 and the second data line Data2 can be decreased and the coupling between the third touch signal transmission line TP3 and the second data line Data2 can be decreased, thereby reducing the influence of the coupling capacitance on the data signal transmitted on the second data line Data2.

Moreover, when the third touch signal transmission line TP3 is disposed, in order to further reduce the wiring length of the third touch signal transmission line TP3 and decrease the coupling between the third touch signal transmission line TP3 and the fourth data signal transmission line Data24, the third touch signal transmission line TP3 may also extend vertically, that is, the extending direction of the third touch signal transmission line TP3 is the same as the extending direction of its closest fourth data signal transmission line Data24.

In addition, when the number of the touch signal lines TP in the display panel is larger than that of the fourth data signal transmission lines Data24, the touch signal lines TP may also be disposed adjacent to the third data signal transmission lines Data23.

Figure 8:
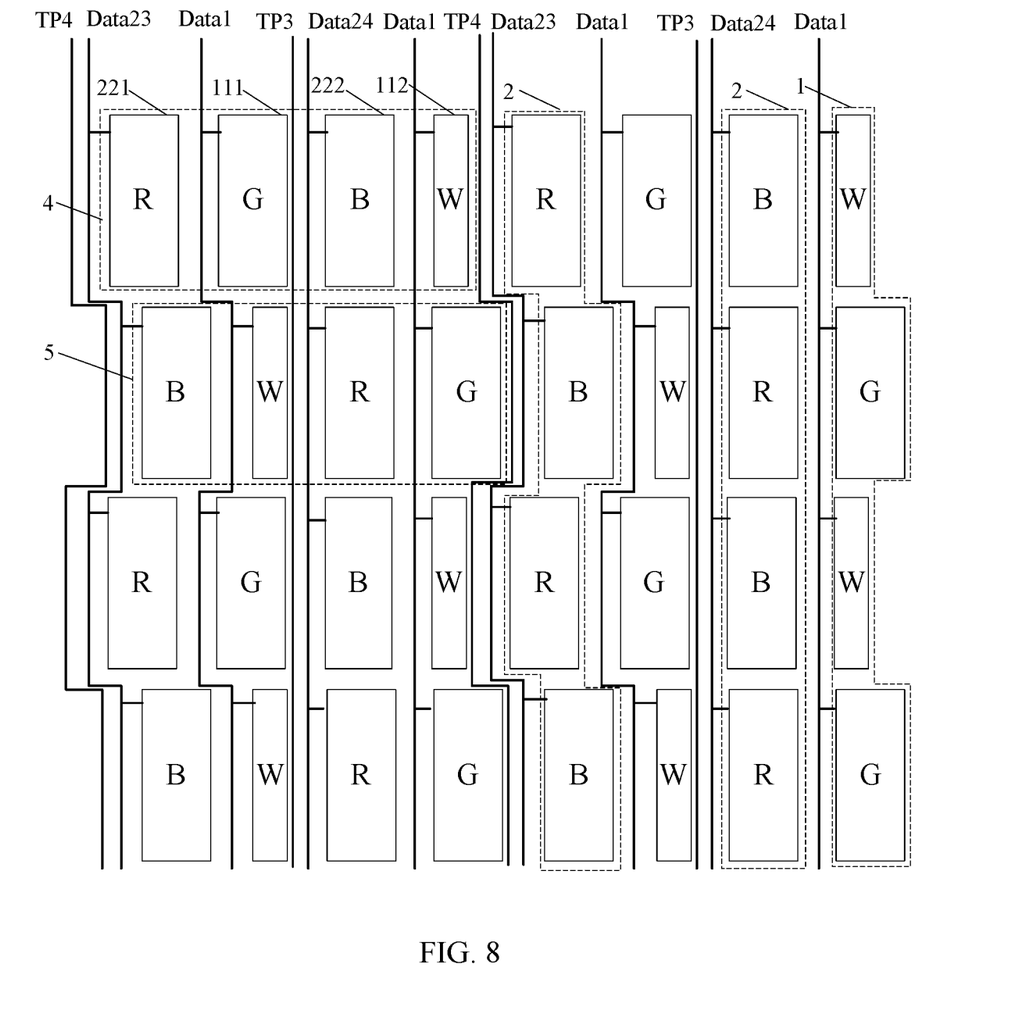
FIG. 8 is still another arrangement schematic diagram of a touch signal line of a display panel provided by an embodiment of the present disclosure.

As shown in FIG. 8, the touch signal lines TP may also include a fourth touch signal transmission line TP4 disposed adjacent to the third data signal transmission line Data23 such that the distance from the fourth touch signal transmission line TP4 to its closest third data signal transmission line Data23 is smaller than the distance from the fourth touch signal transmission line TP4 to its closest first data line Data1.

Moreover, when the fourth touch signal transmission line TP4 is disposed, the extending direction of the fourth touch signal transmission line TP4 may be as the same as the extending direction of its closest third data signal transmission line Data23, that is, the fourth touch signal transmission line TP4 is also extending in a bent way. When the fourth touch signal transmission line TP4 and the third data signal transmission line Data23 are disposed in different layers, due to the same extending direction, the fourth touch signal transmission line TP4 and the third data signal transmission line Data23 may be formed using the same mask plate, so as to reduce the manufacturing cost. When the fourth touch signal transmission line TP4 and the third data signal transmission line Data23 are disposed in a same layer, due to the same extending direction, the design complexity of the mask plate may be decreased by using a same mask plate to form the fourth touch signal transmission line TP4 and the third data signal transmission line Data23.

It should be noted that, compared with disposing the touch signal line TP adjacent to the first data line Data1, the influence on the overall illumination brightness of the display panel resulting from the touch signal line TP will be decreased, regardless of whether the touch signal line TP is disposed adjacent to the third data signal transmission line Data23 or the fourth data signal transmission line Data24.

In addition, it should be further noted that, the arrangement of the abovementioned first and second sub-pixels is merely for schematic illustration. In a practical application, the display panel may also adopt other arrangements for the sub-pixels, which will not be limited by the embodiments.

Taking the arrangement of the sub-pixels shown in FIG. 5 as an example, when the number of the touch signal lines TP is smaller than that of the second data lines Data2, the touch signal lines TP only need to be disposed adjacent to part of the second data lines Data2, in this case, the touch signal lines TP can be regularly arranged in the display region. For example, the touch signal lines TP are dispersedly arranged in the entire display region; adjacent two touch signal lines TP are spaced from each other by the same number of first sub-pixel group(s) 1 and second sub-pixel group(s) 2; or, the number of first sub-pixel group(s) 1 and the second sub-pixel group(s) 2 between adjacent two touch signal lines TP has a certain regularity.

Figure 9:
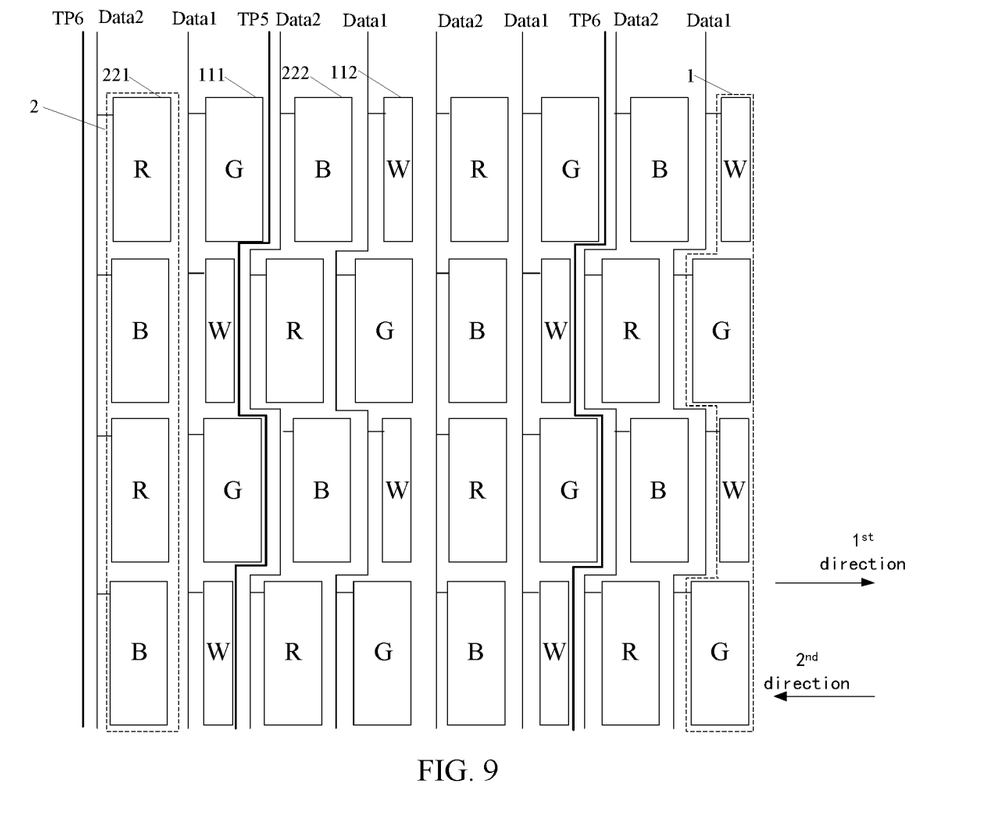
FIG. 9 is still another arrangement schematic diagram of a touch signal line of a display panel provided by an embodiment of the present disclosure.

Exemplarily, as shown in FIG. 9, the touch signal lines TP include a plurality of fifth touch signal transmission lines TP5 and a plurality of sixth touch signal transmission lines TP6, which are arranged at intervals.

One first sub-pixel group 1 and one second sub-pixel group 2 are arranged between the fifth touch signal transmission line TP5 and the sixth touch signal transmission line TP6 adjacent to this fifth touch signal transmission line TP5 in a second direction, and the second direction is opposite to the first direction. Two first sub-pixel groups 1 and two second sub-pixel groups 2 are alternately arranged between the fifth touch signal transmission line TP5 and the sixth touch signal transmission line TP6 adjacent to this fifth touch signal transmission line TP5 in the first direction.

The second data signal lines Data2 coupled with the touch signal lines TP are dispersedly arranged by dispersedly arranging the touch signal lines TP in the display region, thereby avoiding the phenomenon that the illumination brightness in a certain region deviates.

Figure 10:
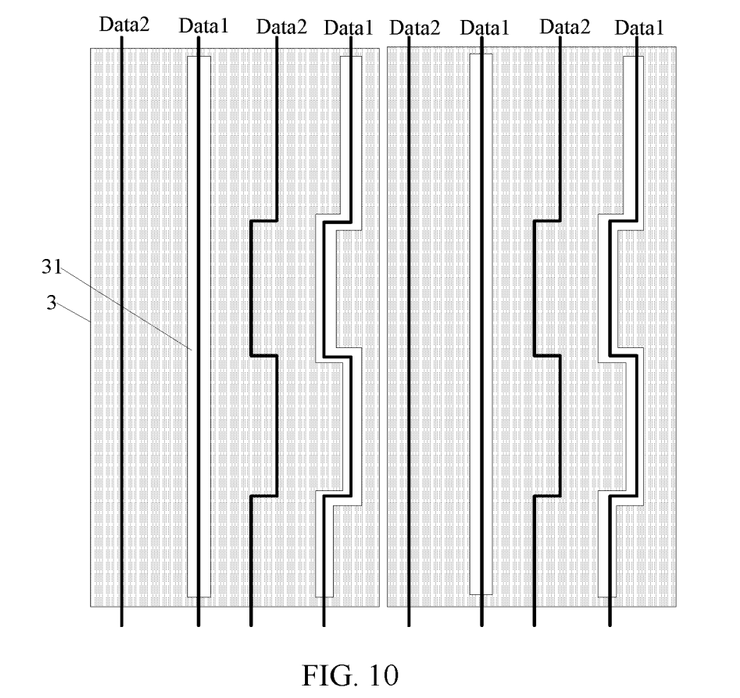
FIG. 10 is a structural schematic diagram of a touch electrode of a display panel provided by an embodiment of the present disclosure.

In addition, as shown in FIG. 10, each touch electrode 3 may be provided with a plurality of first hollow regions 31, each of which is formed into a strip shape. The extending direction of the first hollow region 31 is the same as the extending direction of the first data line Data1. The orthographic projection of a portion of the first data line Data1 on the plane where the touch electrode 3 is located is within the first hollow region 31.

In a traditional touch electrode, the touch electrode is arranged in a whole surface. There is a large overlapping region between the orthographic projection of the touch electrode on the layer of the second data line and the second data line. However, in this embodiment, by providing the first hollow regions 31 within the touch electrode 3, the overlapping area between the touch electrode 3 and the first data line Data1 can be decreased and the coupling therebetween can be decreased, so as to further reduce the attenuation of the data signal transmitted on the first data line Data1 caused by the coupling capacitance.

Figure 11:
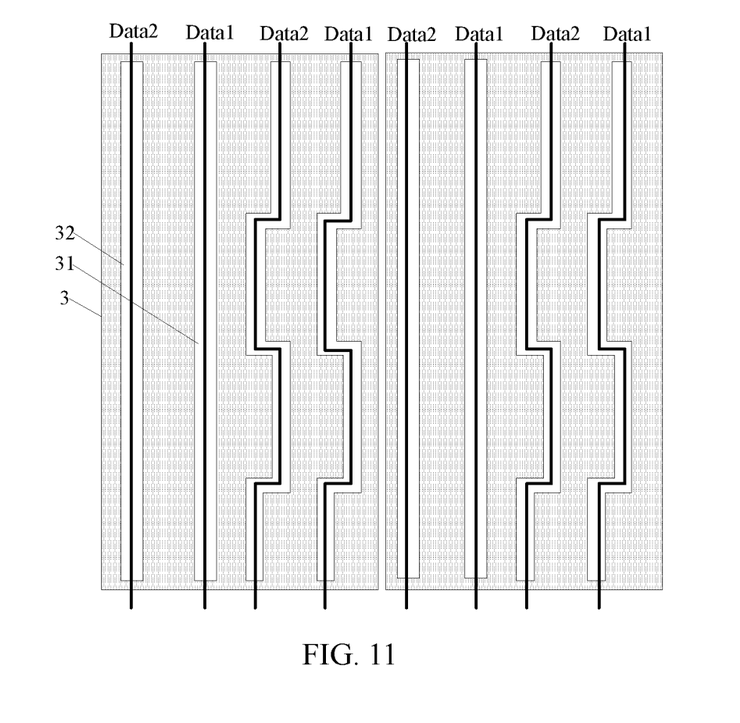
FIG. 11 is another structural schematic diagram of a touch electrode of a display panel provided by an embodiment of the present disclosure.

Further, as shown in FIG. 11, in addition to the first hollow regions 31, each touch electrode 3 is further provided with a plurality of second hollow regions 31, each of which is formed into a strip shape. The extending direction of the second hollow region is the same as the extending direction of the second data line Data2. The orthographic projection of a portion of the second data line Data1 on the plane where the touch electrode 3 is located is within the second hollow region 32.

In a similar way, by providing the second hollow regions 32 within the touch electrode 3, the overlapping area between the touch electrode 3 and the second data line Data2 can be further decreased and the coupling therebetween can be decreased, so as to further reduce the attenuation of the data signal transmitted on the second data line Data2 caused by the coupling capacitance.

In addition, in order to reduce the manufacturing cost, the touch electrode 3 may be multiplexed as a common electrode for transmitting a common signal.

Figure 12:
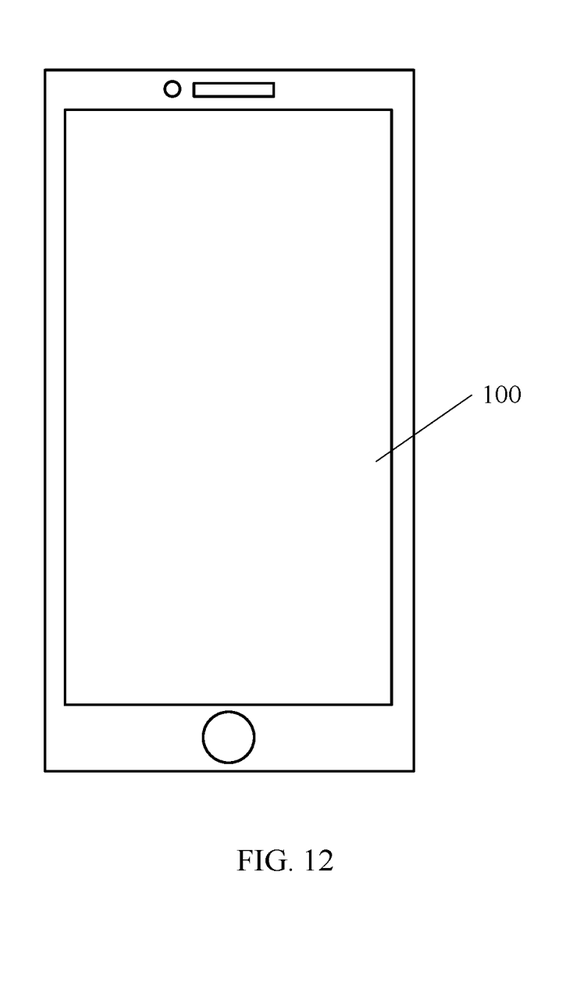
FIG. 12 is a structural schematic diagram of a display panel provided by an embodiment of the present disclosure.

The present disclosure further provides a display device, as shown in FIG. 12, the display device includes the display panel 100 described above, wherein the structure of the display panel 100 has been illustrated in details in the above embodiments and will not be repeated herein. Of course, the display device shown in FIG. 12 is merely for schematic illustration, the display device may be, for example, any electronic apparatus having a display function, such as a cellphone, a tablet computer, a notebook computer, an e-book or the like.

The display device includes the display panel described above, and the touch signal line of the display panel is disposed adjacent to the second data line, therefore, with this display device, the distance between the touch signal line and the first data line can be increased, the coupling capacitance between the touch signal line and the first data line can be decreased, the influence on the brightness of the displayed image can be ameliorated when the illumination brightness of the first pixel offsets from its standard value, and the display quality can be improved.

The above embodiments are merely preferred embodiments of the present disclosure and not intended to limit the present disclosure. Any modification, equivalent alternation, improvement and the like falling in the spirit and principle of the present disclosure shall be included in the protection scope of the present disclosure.

What is claimed is:

1. A display panel having red sub-pixels, blue sub-pixels, green sub-pixels, and high-brightness sub-pixels, comprising:
   a plurality of first sub-pixel groups and a plurality of second sub-pixel groups, wherein the plurality of first sub-pixel groups and the plurality of second sub-pixel groups are arranged alternately in a row direction, the plurality of first sub-pixel groups each comprises a plurality of first sub-pixels arranged in a column direction, and the plurality of second sub-pixel groups each comprises a plurality of second sub-pixels arranged in the column direction, and a contribution value of the first sub-pixels to an illumination brightness of the display panel is greater than a contribution value of the second sub-pixels to the illumination brightness of the display panel;
   a plurality of first data lines corresponding to the plurality of first sub-pixel groups in one-to-one correspondence, wherein each of the plurality of first data lines is connected to a plurality of first sub-pixels in a corresponding first sub-pixel group;
   a plurality of second data lines corresponding to the plurality of second sub-pixel groups in one-to-one correspondence, wherein each of the plurality of second data lines is connected to a plurality of second sub-pixels in a corresponding second sub-pixel group; and
   a plurality of touch electrodes and a plurality of touch signal lines, wherein each of the plurality of touch signal lines is connected to a respective one of the plurality of touch electrodes, and a distance from each of the plurality touch signal lines to its closest second data line is smaller than a distance from the touch signal line to its closest first data line,
   wherein each of the plurality of first sub-pixel groups comprises one of the green sub-pixels and one of the high-brightness sub-pixels, and each of the plurality of second sub-pixel groups comprises one of the red sub-pixels and one of the blue sub-pixels;
   wherein in the row direction, a width of the one of the high-brightness sub-pixels is smaller than a width of the one of the green sub-pixels that is located in a same column with the one of the high-brightness sub-pixels; and
   wherein the plurality of second data lines comprises a first data signal transmission line and a second data signal transmission line, each of the plurality of second sub-pixels comprises two first edges along the row direction, an extending direction of the second data signal transmission line is the same as an extending direction of first edges, on a same side of the plurality of second sub-pixels, of the plurality of second sub-pixels.

2. The display panel according to claim 1, wherein the plurality of touch signal lines is disposed in a different layer from the plurality of second data lines, and an orthographic projection of each of the plurality of touch signal lines on the layer of the plurality of second data lines at least partially overlaps with a corresponding one of the plurality of second data lines.

3. The display panel according to claim 2, wherein a width of each of the plurality of touch signal lines in a row direction is smaller than a width of each of the plurality of second data lines in a row direction.

4. The display panel according to claim 1, wherein the plurality of touch signal lines is disposed in a different layer from the plurality of second data lines, and there is no overlapping between an orthographic projection of each of the plurality of touch signal lines on the layer of the plurality of second data lines and a corresponding one of the plurality of second data lines.

5. The display panel according to claim 1, wherein the plurality of touch signal lines and the plurality of second data lines are disposed in a same layer, and for each of the plurality of second data lines, a corresponding one of the plurality of touch signal lines is located on one side of the second data line away from a corresponding second sub-pixel group.

6. The display panel according to claim 1, wherein,
the display panel comprises a plurality of first pixel units that are repeatedly arranged in odd-numbered rows and a plurality of second pixel units that are repeatedly arranged in even-numbered rows;
the plurality of first pixel units each comprises a red sub-pixel of the red sub-pixels, a green sub-pixel of the green sub-pixels, a blue sub-pixel of the blue sub-pixels and a high-brightness sub-pixel of the high-brightness sub-pixels sequentially arranged in a first direction parallel to the row direction; and
the plurality of second pixel units each comprises a blue sub-pixel of the blue sub-pixels, a high-brightness sub-pixel of the high-brightness sub-pixels, a red sub-pixel of the red sub-pixels and a green sub-pixel of the green sub-pixels sequentially arranged in the first direction.

7. The display panel according to claim 6, wherein each of the red sub-pixel of each of the plurality of first pixel units and the red sub-pixel of each of the plurality of second pixel units has a width in the row direction equal to a width of each of the blue sub-pixel of each of the plurality of first pixel units and the blue sub-pixel of each of the plurality of second pixel units in the row direction, and a width of each of the high-brightness sub-pixel of each of the plurality of first pixel units and the high-brightness sub-pixel of each of the plurality of second pixel units in the row direction is smaller than a width of each of the red sub-pixel of each of the plurality of first pixel units and the red sub-pixel of each of the plurality of second pixel units in the row direction.

8. The display panel according to claim 7, wherein,
in a second sub-pixel group comprising red sub-pixels of first pixel units and blue sub-pixels of second pixel units, any one red sub-pixel and any one blue sub-pixel, which are adjacent, are aligned;
in a second sub-pixel group comprising blue sub-pixels of first pixel units and red sub-pixels of second pixel units, any one blue sub-pixel and any one red sub-pixel, which are adjacent, are staggered from each other;
the first data signal transmission line corresponds to a second sub-pixel group comprising red sub-pixels of first pixel units, and an extending direction of the first data signal transmission line is the same as an extending direction of each of a plurality of second sub-pixels in a corresponding second sub-pixel group;
the second data signal transmission line corresponds to a second sub-pixel group comprising blue sub-pixels of first pixel units, and an extending direction of the second data signal transmission line is the same as an extending direction of each of a plurality of second sub-pixels in a corresponding second sub-pixel group;
the plurality of touch signal lines comprises a first touch signal transmission line, and a distance from the first touch signal transmission line to its closest first data signal transmission line is smaller than a distance from the first touch signal transmission line to its closest first data line.

9. The display panel according to claim 8, wherein an extending direction of the first touch signal transmission line is the same as an extending direction of its closest first data signal transmission line.

10. The display panel according to claim 8, wherein the plurality of touch signal lines further comprises a second touch signal transmission line, and a distance from the second touch signal transmission line to its closest second data signal transmission line is smaller than a distance from the second touch signal transmission line to its closest first data line.

11. The display panel according to claim 10, wherein an extending direction of the second touch signal transmission line is the same as an extending direction of its closest second data signal transmission line.

12. The display panel according to claim 7, wherein,
in a second sub-pixel group comprising red sub-pixels of first pixel units and blue sub-pixels of second pixel units, any one red sub-pixel and any one blue sub-pixel, which are adjacent, are staggered from each other;
in a second sub-pixel group comprising blue sub-pixels of first pixel units and red sub-pixels of second pixel units, any one blue sub-pixel and any one red sub-pixel, which are adjacent, are aligned;
the plurality of second data lines comprises a third data signal transmission line and a fourth data signal transmission line, wherein the third data signal transmission line corresponds to a second sub-pixel group comprising red sub-pixels of first pixel units, and an extending direction of the third data signal transmission line is the same as an extending direction of each of a plurality of second sub-pixels in a corresponding second sub-pixel group;
the fourth data signal transmission line corresponds to a second sub-pixel group comprising blue sub-pixels of first pixel units, and an extending direction of the fourth data signal transmission line is the same as an extending direction of each of a plurality of second sub-pixels in a corresponding second sub-pixel group;
the plurality of touch signal lines comprises a third touch signal transmission line, and a distance from the third touch signal transmission line to its closest fourth data signal transmission line is smaller than a distance from the third touch signal transmission line to its closest first data line.

13. The display panel according to claim 12, wherein an extending direction of the third touch signal transmission line is the same as an extending direction of its closest fourth data signal transmission line.

14. The display panel according to claim 12, wherein the plurality of touch signal lines further comprises a fourth touch signal transmission line, and a distance from the fourth touch signal transmission line to its closest third data signal transmission line is smaller than a distance from the fourth touch signal transmission line to its closest first data line.

15. The display panel according to claim 14, wherein an extending direction of the fourth touch signal transmission line is the same as an extending direction of a third data signal transmission line closest to the fourth touch signal transmission line.

16. The display panel according to claim 1, wherein each of the plurality of touch electrodes is provided with a plurality of first hollow regions, each of which is formed into a strip shape; an extending direction of the plurality of first hollow regions is the same as an extending direction of the plurality of first data lines; and an orthographic projection of a portion of the plurality of first data lines on a plane where the touch electrode is located is within the plurality of first hollow regions.

17. The display panel according to claim 16, wherein each of the plurality of touch electrodes is provided with a plurality of second hollow regions, each of which is formed into a strip shape; an extending direction of the plurality of second hollow regions is the same as an extending direction of the plurality of second data lines; and an orthographic projection of a portion of the plurality of second data lines on a plane where the touch electrode is located is within the plurality of second hollow regions.

18. The display panel according to claim 1, wherein the plurality of touch electrodes is multiplexed as a common electrode.

* * * * *